US012571141B2

(12) United States Patent (10) Patent No.: US 12,571,141 B2
Lim et al. (45) Date of Patent: Mar. 10, 2026

(54) MULTI-LAYER MELTBLOWN NON-WOVEN FABRIC AND PREPARATION METHOD THEREOF

(71) Applicant: TORAY ADVANCED MATERIALS KOREA INC., Gumi-si (KR)

(72) Inventors: Seong Su Lim, Gumi-si (KR); Kwang Young Jung, Gumi-si (KR)

(73) Assignee: Toray Advanced Materials Korea Inc., Gumi-si (KR)

( * ) Notice: Subject to any disclaimer, the term of this patent is extended or adjusted under 35 U.S.C. 154(b) by 137 days.

(21) Appl. No.: 18/550,671

(22) PCT Filed: May 3, 2022

(86) PCT No.: PCT/KR2022/006369
§ 371 (c)(1),
(2) Date: Sep. 14, 2023

(87) PCT Pub. No.: WO2022/245016
PCT Pub. Date: Nov. 24, 2022

(65) Prior Publication Data
US 2024/0035213 A1 Feb. 1, 2024

(30) Foreign Application Priority Data

May 17, 2021 (KR) ........................ 10-2021-0063282

(51) Int. Cl.
| *D01F 1/08* | (2006.01) |
| *D04H 1/4382* | (2012.01) |
| *D04H 1/4391* | (2012.01) |
| *D04H 1/559* | (2012.01) |
| *B60R 13/08* | (2006.01) |

(52) U.S. Cl.
CPC .............. *D04H 1/559* (2013.01); *D01F 1/08* (2013.01); *D04H 1/43838* (2020.05); *D04H 1/43914* (2020.05); *B60R 13/08* (2013.01); *D10B 2505/12* (2013.01)

(58) Field of Classification Search
CPC ............... D04H 1/559; D04H 1/43838; D04H 1/43914; D01F 1/08; B60R 13/08; D10B 2505/12
See application file for complete search history.

(56) References Cited

U.S. PATENT DOCUMENTS

| 2009/0242325 A1* | 10/2009 | Dellinger ................. E04B 1/84 181/290 |
| 2014/0097037 A1* | 4/2014 | Wingfield ................ E04B 1/84 181/290 |
| 2017/0226673 A1* | 8/2017 | Kwon .................... D04H 1/559 |

FOREIGN PATENT DOCUMENTS

| JP | 2005-266445 A | 9/2005 |
| JP | 2018-003191 A | 1/2018 |
| KR | 10-2010-0057103 A | 5/2010 |
| KR | 101349262 B1 * | 1/2014 .......... D01D 5/0985 |
| KR | 10-2017-0047209 A | 5/2017 |
| KR | 10-1922806 B1 | 11/2018 |
| KR | 10-2059557 B1 | 12/2019 |
| KR | 10-2020-0119511 A | 10/2020 |

OTHER PUBLICATIONS

English translation of JP 2005-43779 to Hiroko obtained from PE2E database (Year: 2005).*
English translation of KR-101349262 to Joo et al. obtained from PE2E database (Year: 2014).*
International Search Report dated Aug. 25, 2022 in International Application No. PCT/KR2022/006369.

* cited by examiner

*Primary Examiner* — Jeremy R Pierce
(74) *Attorney, Agent, or Firm* — Knobbe, Martens, Olson & Bear, LLP

(57) ABSTRACT

The present invention relates to a multilayer meltblown nonwoven fabric and a method of manufacturing the same. In particular, the present invention relates to a multilayer meltblown nonwoven fabric having excellent lightweightness while exhibiting excellent durability, and a method of manufacturing the same.

9 Claims, No Drawings

MULTI-LAYER MELTBLOWN NON-WOVEN FABRIC AND PREPARATION METHOD THEREOF

CROSS-REFERENCE TO RELATED APPLICATION

This application claims priority to and the benefit of Korean Patent Application No. 10-10-2021-006328220, filed May 17, 2021, the disclosure of which is incorporated herein by reference in its entirety.

TECHNICAL FIELD

The present invention relates to a multilayer meltblown nonwoven fabric and a method for manufacturing the same, and more particularly, to a multilayer meltblown nonwoven fabric having excellent lightweightness while exhibiting excellent durability, and a method of manufacturing the same.

BACKGROUND TECHNOLOGY

The types of noise sources such as vacuum cleaners, dishwashers, washing machines, air conditioners, air purifiers, computers, projectors, and the like are increasingly becoming more diverse, and thus noise pollution problems are getting more serious. Therefore, continuous efforts are made to block or reduce the noise produced from various noise sources in this modern life. In overseas advanced countries, the legal regulations for adjusting a level of noise between floors and households of multi-family houses such as apartments are becoming increasingly strict. Also, the noise introduced into the interior of a car is representative of engine noise generated by the engine and transmitted through the car body or air, and frictional noise between wheels and the ground. In order to suppress these types of noise, engine covers and hood insulation have been used, but the actual noise reduction effect is insignificant. In this case, outer dash insulation attached to the outside of a vehicle, inner dash insulation attached to the inside of the vehicle, and floor carpets, and the like play a role in removing most of the noise.

There are two ways to improve noise: improving sound absorption performance and improving sound insulation performance In this case, sound absorption means that the generated sound energy is converted into thermal energy while being transmitted through the internal path of a material and then extinguished. Also, sound insulation means that the generated sound energy is reflected and blocked by a shield.

Felt, sponge, polyurethane foam, and the like have been mainly used as the sound absorbing materials typically used in the art. In addition, examples of the sound absorbing materials include sound absorbing materials in which a thermoplastic or thermosetting resin is impregnated with compressed fibers, glass fibers, rock wool, regenerated fibers, or the like. However, most of the sound absorbing materials as described above have problems in that they do not have sufficient sound insulation performance, and contain components harmful to the human body.

In recent years, as the regulations on environmental friendliness and recyclability have been gradually strengthened in each country, the rate of use of fibrous sound-absorbing materials based on thermoplastic resins such as PET or polypropylene (PP) is rising. Also, the fuel efficiency regulations of vehicles are gradually intensifying in order to reduce carbon dioxide. As fuel efficiency may be improved by reducing the weight of parts, it is necessary to develop a lightweight sound absorbing material with improved performance.

Accordingly, research has been actively conducted to develop a sound absorbing material having an excellent sound absorbing function, which is harmless to the human body and is capable of effectively absorbing and reducing noise while reducing a thickness thereof.

As the sound absorbing materials researched and developed in the art, there is disclosed a sound absorbing material in the form of a web, which contains 10% by weight or more of general stable fibers having a diameter of 10 μm or more and crimped into general meltblown fibers. Also, there is disclosed a thermal insulation material serving as a sound absorbing material and in the form of a web, which contains bulky fibers crimped into general meltblown fibers. However, webs made of general meltblown fibers cannot have a dense organizational structure due to their very large porosity, the durability of the sound absorbing materials is insufficient, and the sound absorbing materials do not provide a sufficient sound absorbing effect. Also, there is a problem in that the thickness of the sound absorbing materials should be greatly increased in order to provide a sufficient sound absorbing effect.

Also, there is disclosed a sound absorbing material, which is a three-dimensional (3D) nonwoven fabric web made by melt-blowing ultrafine fibers. However, because the 3D nonwoven fabric does not have a dense organizational structure due to its large porosity, it lacks durability, and the thickness of the 3D nonwoven fabric web should be greatly increased due to its characteristics in order to provide a sufficient sound absorbing effect. Also, the 3D nonwoven fabric web has drawbacks in that manufacturing costs greatly increase because it is very difficult to manufacture the three-dimensionally constructed nonwoven fabric web as described above.

Further, there is disclosed a meltblown nonwoven fabric having excellent sound absorption and heat insulation properties, wherein the meltblown nonwoven fabric has a single structure having a density of 50 to 4,000 g/m² and composed of fibers having an average diameter of 0.1 to 20 μm. However, the meltblown nonwoven fabric having such a single structure has a problem in that the soundproofing performance was not improved much compared to the conventional sound absorbing materials.

DETAILED DESCRIPTION OF THE INVENTION

Technical Tasks

The present invention is designed to solve the problems of the related art, and thus it is an object of the present invention to provide a multilayer meltblown nonwoven fabric having excellent lightweightness while exhibiting excellent durability, and a method of manufacturing the same.

Technical Solution

To solve the above problems, there is provided a multilayer meltblown nonwoven fabric of the present invention which includes a first meltblown nonwoven fabric composed of hollow fibers having a hollowness of 30% or more; and a second meltblown nonwoven fabric stacked on one surface or both surfaces of the first meltblown nonwoven fabric.

According to one preferred embodiment of the present invention, the second meltblown nonwoven fabric may be composed of ultrafine fibers having an average diameter of 1 to 10 μm.

According to one preferred embodiment of the present invention, the hollow fiber may have an average diameter of 15 to 30 μm and a specific gravity of 1.0 or less.

According to one preferred embodiment of the present invention, the first meltblown nonwoven fabric and the second meltblown nonwoven fabric may have a basis weight ratio of 1:0.22 to 0.42.

According to one preferred embodiment of the present invention, the first meltblown nonwoven fabric and the second meltblown nonwoven fabric may have a thickness ratio of 1:0.35 to 0.65.

According to one preferred embodiment of the present invention, the hollow fibers may include one or more selected from polyethylene terephthalate (PET) fibers, polytetramethylene terephthalate (PTT) fibers, polybutylene terephthalate (PBT) fibers, and polypropylene (PP) fibers.

According to one preferred embodiment of the present invention, the ultrafine fibers may include one or more selected from polyethylene terephthalate (PET) fibers, polytetramethylene terephthalate (PTT) fibers, polybutylene terephthalate (PBT) fibers, and polypropylene (PP) fibers.

Also, there is provided a method of manufacturing a multilayer meltblown nonwoven fabric according to the present invention, which includes: a first step of spinning a composition for forming hollow fibers to prepare hollow fibers having a hollowness of 30% or more and stacking the prepared hollow fibers to manufacture a first meltblown nonwoven fabric; and a second step of spinning a composition for forming ultrafine fibers to prepare ultrafine fibers having an average diameter of 1 to 10 μm and stacking the prepared ultrafine fibers on one surface or both surfaces of the first meltblown nonwoven fabric to form a second meltblown nonwoven fabric on one surface or both surfaces of the first meltblown nonwoven fabric.

According to one preferred embodiment of the present invention, in the method of manufacturing a multilayer meltblown nonwoven fabric according to the present invention, the hollow fibers may have an average diameter of 15 to 30 μm and a specific gravity of 1.0 or less.

According to one preferred embodiment of the present invention, the composition for forming hollow fibers may include one or more selected from a polyethylene terephthalate (PET) resin, a polytetramethylene terephthalate (PTT) resin, a polybutylene terephthalate (PBT) resin, and a polypropylene (PP) resin.

According to one preferred embodiment of the present invention, the composition for forming ultrafine fibers may include one or more selected from a polyethylene terephthalate (PET) resin, a polytetramethylene terephthalate (PTT) resin, a polybutylene terephthalate (PBT) resin, and a polypropylene (PP) resin.

Further, there is provided a multilayer spunbond nonwoven fabric which includes a spunbond nonwoven fabric as the outermost layer and has at least one meltblown nonwoven fabric layer formed as an inner layer, wherein the meltblown nonwoven fabric layer may include the multilayer meltblown nonwoven fabric of the present invention.

According to one preferred embodiment of the present invention, the multilayer spunbond nonwoven fabric may be used for automobile sound-absorbing materials.

Hereinafter, the terms used in the present invention will be described.

As used in the present invention, the term "fiber" refers to yarn or thread, and includes various types of yarn and thread known in the art.

Advantageous Effects

The multilayer meltblown nonwoven fabric of the present invention has excellent lightweightness while exhibiting excellent durability.

Also, the multilayer meltblown nonwoven fabric of the present invention has excellent sound absorption properties, excellent fiber fineness uniformity, and an excellent compressive modulus.

EMBODIMENTS

Hereinafter, the embodiments of the present invention will be described in detail with reference to the accompanying drawings to be easily implemented by those having ordinary skill in the art to which the present invention pertains. However, it should be understood that the present invention may be embodied in various different forms, and is not construed as being limited to the embodiments set forth herein. In order to clearly describe the present invention, parts not related to the description are omitted, and like parts are denoted by like reference numerals throughout the specification.

A multilayer meltblown nonwoven fabric of the present invention may include a first meltblown nonwoven fabric and a second meltblown nonwoven fabric stacked on one surface or both surfaces, preferably one surface, of the first meltblown nonwoven fabric.

First, the first meltblown nonwoven fabric may be composed of hollow fibers, and the hollow fibers constituting the first meltblown nonwoven fabric may have a hollowness of 30% or more, preferably 30 to 45%, and more preferably 35 to 40%. When the hollowness of the hollow fibers is less than 30%, there may be a problem of insufficient lightweightness and sound absorption performance.

Also, the hollow fibers constituting the first meltblown nonwoven fabric may have an average diameter of 15 to 30 μm, and preferably 25 to 30 μm. When the average diameter of the hollow fibers is less than 15 μm, it is difficult to realize a hollow morphology, and a sound absorption coefficient in a low-frequency region may be reduced when the hollow fibers are used as a sound absorbing material. On the other hand, when the average diameter of the hollow fibers is greater than 30 μm, a solidification speed may slow down during the manufacture of the hollow fibers, and a volume of the hollow fibers may decrease during the manufacture of nonwoven fabrics. Also, a sound absorption coefficient in a low/medium frequency region may be reduced when the hollow fibers are used as the sound absorbing material.

In addition, the hollow fibers constituting the first meltblown nonwoven fabric may have a specific gravity of 1.0 or less, preferably 0.80 to 1.00, and more preferably 0.85 to 0.95. When the specific gravity of the hollow fibers is greater than 1.0, weight reduction may be reduced, and it may be difficult to express effective sound absorption performance relative to weight due to a decreased volume of fibers.

Also, the hollow fibers constituting the first meltblown nonwoven fabric may include one or more selected from polyethylene terephthalate (PET) fibers, polytetramethylene terephthalate (PTT) fibers, polybutylene terephthalate (PBT) fibers, and polypropylene (PP) fibers, and preferably may include polypropylene (PP) fibers. When fibers made of materials other than the polypropylene (PP) fibers are used as the hollow fibers, the weight of the fibers themselves increases due to a high specific gravity. Therefore, even when the hollowness is satisfactory, a weight reduction effect may be lowered due to the high specific gravity, and it may be difficult to express effective sound absorption performance relative to weight.

In addition, the first meltblown nonwoven fabric may have a basis weight of 10 to 700 gsm, preferably 33 to 350 gsm, more preferably 50 to 300 gsm, and further preferably 200 to 280 gsm.

Further, the first meltblown nonwoven fabric may have a thickness of 1 to 80 mm, preferably 2 to 60 mm, more preferably 3 to 50 mm, and further preferably 35 to 45 mm.

Next, the second meltblown nonwoven fabric may be composed of ultrafine fibers having an average diameter of 1 to 10 μm, preferably 2 to 8 μm, more preferably 3 to 7 μm, and further preferably 2 to 4 μm. When the average diameter of the ultrafine fibers is less than 1 μm, the strength of nonwoven fabrics may be degraded. On the other hand, when the average diameter of the ultrafine fibers is greater than 10 μm, sound absorption performance in a high-frequency region may be reduced.

Also, the ultrafine fibers constituting the second meltblown nonwoven fabric may include one or more selected from polyethylene terephthalate (PET) fibers, polytetramethylene terephthalate (PTT) fibers, polybutylene terephthalate (PBT) fibers, and polypropylene (PP) fibers, and preferably may include polypropylene (PP) fibers. When fibers made of materials other than the polypropylene (PP) fibers are used as the ultrafine fibers, the weight of the fibers themselves increases due to a high specific gravity. Therefore, even when the hollowness is satisfactory, a weight reduction effect may be lowered due to the high specific gravity, and it may be difficult to express effective sound absorption performance relative to weight.

In addition, the second meltblown nonwoven fabric may have a basis weight of 10 to 700 gsm, preferably 33 to 350 gsm, more preferably 50 to 165 gsm, and further preferably 60 to 100 gsm.

Additionally, the second meltblown nonwoven fabric may have a thickness of 1 to 80 mm, preferably 2 to 60 mm, more preferably 3 to 40 mm, and further preferably 10 to 30 mm.

Meanwhile, the first meltblown nonwoven fabric and second meltblown nonwoven fabric may have a basis weight ratio of 1:0.22 to 0.42, preferably a basis weight ratio of 1:0.25 to 0.39, more preferably a basis weight ratio of 1:0.28 to 0.36, and further preferably a basis weight ratio of 1:0.3 to 0.34. When the basis weight ratio is less than 1:0.25, the sound absorption coefficient in a high-frequency region may be reduced when the nonwoven fabrics are used as the sound absorbing material. On the other hand, when the basis weight ratio is greater than 1:0.39, the sound absorption coefficient in a low-frequency region may be reduced when the nonwoven fabrics are used as the sound absorbing material.

Further, the first meltblown nonwoven fabric and the second meltblown nonwoven fabric may have a thickness ratio of 1:0.35 to 0.65, preferably a thickness ratio of 1:0.4 to 0.6, more preferably a thickness ratio of 1:0.45 to 0.55, and further preferably a thickness ratio of 1:0.47 to 0.53. When the thickness ratio is less than 1:0.35, the sound absorption coefficient in a high-frequency region may be reduced when the nonwoven fabrics are used as the sound absorbing material. Also, the productivity of nonwoven fabrics may be degraded due to an excessive decrease in weight at the same volume of the nonwoven fabrics, and stiffness may also be degraded. On the other hand, when the thickness ratio is greater than 1:0.65, the sound absorption coefficient in a low-frequency region may be reduced when the nonwoven fabrics are used as the sound absorbing material, and the nonwoven fabrics may sag during a manufacturing process due to an excessive decrease in weight at the same volume of the nonwoven fabrics, which results in poor process passability.

Meanwhile, the multilayer meltblown nonwoven fabric of the present invention may have a thickness of 6 to 90 mm, preferably 8 to 80 mm, more preferably 10 to 80 mm, and further preferably 50 to 70 mm. When the thickness of the multilayer meltblown nonwoven fabric is less than 6 mm, sound absorption performance may be poor. On the other hand, when the thickness of the multilayer meltblown nonwoven fabric is greater than 90 mm, there may be a problem of separation caused by the thickness during the assembly of a module to which the sound absorbing material is applied.

Also, the multilayer meltblown nonwoven fabric of the present invention may have a basis weight of 20 to 1,000 gsm, preferably 100 to 500 gsm, and more preferably 280 to 380 gsm.

In addition, the multilayer meltblown nonwoven fabric of the present invention may have a hollow fiber ratio of 50 to 90%, preferably 60 to 85%, more preferably 65 to 80%, and further preferably 70 to 80%. In this case, the hollow fiber ratio is obtained by observing a cross section of the multilayer meltblown nonwoven fabric under an optical microscope to measure an area ratio of the hollow fibers.

As such, the multilayer meltblown nonwoven fabric of the present invention has an advantage in that the sound and heat absorption performance may be expressed because an air layer is formed in hollows. As a result, the multilayer meltblown nonwoven fabric of the present invention has advantages in that it has improved performance compared to conventional sound absorbing materials, and the energy (electric power) consumption during air conditioning and heating may be minimized when it is used for electric cars, which may contribute to an improvement in fuel efficiency.

Meanwhile, the method of manufacturing a multilayer meltblown nonwoven fabric according to the present invention includes a first step and a second step.

First, the first step of the method of manufacturing a multilayer meltblown nonwoven fabric according to the present invention may include spinning a composition for forming hollow fibers to prepare hollow fibers having a hollowness of 30% or more, preferably 30 to 45%, and more preferably 35 to 40%, and stacking the prepared hollow fibers to manufacture a first meltblown nonwoven fabric.

In this case, the composition for forming hollow fibers may include one or more selected from a polyethylene terephthalate (PET) resin, a polytetramethylene terephthalate (PTT) resin, a polybutylene terephthalate (PBT) resin, and a polypropylene (PP) resin, and preferably may include a polypropylene (PP) resin.

Also, the spinning may be performed in a spinneret for meltblown processing, and the composition for forming hollow fibers may be solidified by high-pressure hot air immediately after the spinning to manufacture hollow fibers (i.e., meltblown fibers).

Also, the prepared hollow fibers may have an average diameter of 15 to 30 μm, preferably 25 to 30 μm, and a specific gravity of 1.0 or less, preferably 0.80 to 1.00, and more preferably 0.85 to 0.95.

Finally, the second step of the method of manufacturing a multilayer meltblown nonwoven fabric according to the present invention may include spinning a composition for forming ultrafine fibers to prepare ultrafine fibers having an average diameter of 1 to 10 μm, preferably 2 to 8 μm, and more preferably 3 to 7 μm, and stacking the prepared ultrafine fibers on one surface or both surfaces, preferably one surface, of the first meltblown nonwoven fabric to form a second meltblown nonwoven fabric on one surface or both surfaces, preferably one surface, of the first meltblown nonwoven fabric.

In this case, the composition for forming ultrafine fibers may include one or more selected from a polyethylene terephthalate (PET) resin, a polytetramethylene terephthalate (PTT) resin, a polybutylene terephthalate (PBT) resin, and a polypropylene (PP) resin, and preferably may include a polypropylene (PP) resin.

Also, the spinning may be performed in a spinneret for meltblown processing, and the composition for forming hollow fibers may be solidified by high-pressure hot air immediately after the spinning to manufacture ultrafine fibers (i.e., meltblown fibers).

In addition, the spinning temperature may be in a range of 230 to 300° C., preferably in a range of 250 to 290° C., more preferably in a range of 260 to 280° C., and further preferably in a range of 265 to 275° C.

Further, the multilayer spunbond nonwoven fabric of the present invention may include the above-described multilayer meltblown nonwoven fabric of the present invention formed in one or more layers.

Specifically, the multilayer spunbond nonwoven fabric of the present invention includes a spunbond nonwoven fabric as the outermost layer and has at least one meltblown nonwoven fabric layer formed as an inner layer, wherein the meltblown nonwoven fabric layer may include the multilayer meltblown nonwoven fabric of the present invention.

The basic nonwoven fabrics of the multilayer spunbond nonwoven fabric according to the present invention may be formed in the form of a spunbond nonwoven fabric/meltblown nonwoven fabric/spunbond nonwoven fabric multilayer. Here, the spunbond nonwoven fabric layer forming the outermost layer may be composed of one or more layers, and the meltblown nonwoven fabric layer formed inside the spunbond nonwoven fabric layer may be composed of one or more layers. Therefore, the number of layers constituting the multilayer spunbond nonwoven fabric is not limited. Such a multilayer spunbond nonwoven fabric of the present invention may be referred to as an "SMS-based nonwoven fabric."

Meanwhile, the multilayer meltblown nonwoven fabric of the present invention may be used for sound absorbing materials, and preferably may be used for automobile sound-absorbing materials.

Also, the multilayer spunbond nonwoven fabric of the present invention may be used for sound absorbing materials, and preferably may be used for automobile sound-absorbing materials.

While the present invention has been described in conjunction with embodiments thereof, it will be understood that present description is not intended to limit the invention to those embodiments. It will be apparent to those skilled in the art to which the present invention pertains that various modifications and variations can be made in the present invention without departing from the spirit or scope of the present invention. For example, the respective components specifically described in the embodiments of the present invention may be modified to implement the present invention. Thus, it is intended that the present invention cover the modifications and variations of the present invention, provided they come within the scope of the appended claims and their equivalents.

Example 1: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 270° C., and then solidified by high-pressure hot air at 300° C. to prepare hollow fibers having a hollowness of 37%, an average diameter of 27 μm and a specific gravity of 0.92. Then, the prepared hollow fibers were stacked to manufacture a first meltblown nonwoven fabric having a basis weight of 250 gsm and a thickness of 40 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 270° C., and then solidified by high-pressure hot air at 300° C. to prepare hollow fibers having an average diameter of 3.5 μm. Then, the prepared hollow fibers were stacked on one surface of the first meltblown nonwoven fabric to form a second meltblown nonwoven fabric having a basis weight of 80 gsm and a thickness of 20 mm, which is a self-bonding nonwoven fabric, on one surface of the first meltblown nonwoven fabric. As a result, a multilayer meltblown nonwoven fabric having a basis weight of 330 gsm, a thickness of 60 mm, and a hollow fiber ratio of 76% was manufactured.

Example 2: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 280° C., and then solidified by high-pressure hot air at 300° C. to prepare hollow fibers having a hollowness of 32%, and average diameter of 27 μm, and a specific gravity of 0.92. Then, the prepared hollow fibers were stacked to manufacture a first meltblown nonwoven fabric having a basis weight of 250 gsm and a thickness of 40 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 280° C., and then solidified by high-pressure hot air at 300° C. to prepare ultrafine fibers having an average diameter of 3.3 μm. Then, the prepared ultrafine fibers were stacked on one surface of the first meltblown nonwoven fabric to form a second meltblown nonwoven fabric having a basis weight of 80 gsm and a thickness of 20 mm, which is a self-bonding nonwoven fabric, on one surface of the first meltblown nonwoven fabric. As a result, a multilayer meltblown nonwoven fabric having a basis weight of 330 gsm, a thickness of 60 mm, and a hollow fiber ratio of 76% was manufactured.

Example 3: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 260° C., and then solidified by high-pressure hot air at 300° C. to prepare hollow fibers having a hollowness of 38%, an average diameter of 27 μm, and a specific gravity of 0.92. Then, the prepared hollow fibers were stacked to manufacture a first meltblown nonwoven fabric having a basis weight of 250 gsm and a thickness of 40 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 280° C., and then solidified by high-pressure hot air at 300° C. to prepare ultrafine fibers having an average diameter of 4.0 μm. Then, the prepared ultrafine fibers were stacked on one surface of the first meltblown nonwoven fabric to form a second meltblown nonwoven fabric having a basis weight of 80 gsm and a thickness of 20 mm, which is a self-bonding nonwoven fabric, on one surface of the first meltblown nonwoven fabric. As a result, a multilayer meltblown nonwoven fabric having a basis weight of 330 gsm, a thickness of 60 mm, and a hollow fiber ratio of 76% was manufactured.

Example 4: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 270° C., and then solidified by high-pressure hot air at 300° C. to prepare hollow fibers having a hollowness of 37%, an average diameter of 27 μm, and a specific gravity of 0.92. Then, the prepared hollow fibers were stacked to manufacture a first meltblown nonwoven fabric having a basis weight of 330 gsm and a thickness of 50 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 270° C., and then solidified by high-pressure hot air at 300° C. to prepare ultrafine fibers having an average diameter of 3.5 μm. Then, the prepared ultrafine fibers were stacked on one surface of the first meltblown nonwoven fabric to form a second meltblown nonwoven fabric having a basis weight of 110 gsm and a thickness of 30 mm, which is a self-bonding nonwoven fabric, on one surface of the first meltblown nonwoven fabric. As a result, a multilayer meltblown nonwoven fabric having a basis weight of 440 gsm, a thickness of 80 mm, and a hollow fiber ratio of 76% was manufactured.

Example 5: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 270° C., and then solidified by high-pressure hot air at 300° C. to prepare hollow fibers having a hollowness of 37%, and average diameter of 27 μm, and a specific gravity of 0.92. Then, the prepared hollow fibers were stacked to manufacture a first meltblown nonwoven fabric having a basis weight of 250 gsm and a thickness of 20 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 270° C., and then solidified by high-pressure hot air at 300° C. to prepare ultrafine fibers having an average diameter of 3.5 μm. Then, the prepared ultrafine fibers were stacked on one surface of the first meltblown nonwoven fabric to form a second meltblown nonwoven fabric having a basis weight of 80 gsm and a thickness of 40 mm, which is a self-bonding nonwoven fabric, on one surface of the first meltblown nonwoven fabric. As a result, a multilayer meltblown nonwoven fabric having a basis weight of 330 gsm, a thickness of 60 mm, and a hollow fiber ratio of 50% was manufactured.

Example 6: Manufacture of Multilayer Meltblown Nonwoven Fabric (1) A polypropylene (PP) resin was prepared as a composition for forming hollow fibers, and the composition for forming hollow fibers was put into a hollow-type spinneret for meltblown processing, spun at a spinning temperature of 270° C., and then solidified by high-pressure hot air at 300° C. to prepare hollow fibers having a hollowness of 37%, an average diameter of 27 μm, and a specific gravity of 0.92. Then, the prepared hollow fibers were stacked to manufacture a first meltblown nonwoven fabric having a basis weight of 280 gsm and a thickness of 40 mm, which is a self-bonding nonwoven fabric.

(2) A polypropylene (PP) resin was prepared as a composition for forming ultrafine fibers, and the composition for forming ultrafine fibers was put into a circular-type spinneret for meltblown processing, spun at a spinning temperature of 270° C., and then solidified by high-pressure hot air at 300° C. to prepare ultrafine fibers having an average diameter of 3.5 μm. Then, the prepared ultrafine fibers were stacked on one surface of the first meltblown nonwoven fabric to form a second meltblown nonwoven fabric having a basis weight of 10 gsm and a thickness of 20 mm, which is a self-bonding nonwoven fabric, on one surface of the first meltblown nonwoven fabric. As a result, a multilayer meltblown nonwoven fabric having a basis weight of 290 gsm, a thickness of 60 mm, and a hollow fiber ratio of 95% was manufactured.

Experimental Example 1: Measurement of Physical Properties of Multilayer Meltblown Nonwoven Fabrics For each of the multilayer meltblown nonwoven fabrics manufactured in Examples 1 to 6, experiments were performed as follows. The results of measurement are shown in the following Table 1.

|

(1) Fiber Fineness Uniformity

Physical properties of each of the multilayer meltblown nonwoven fabrics manufactured in Examples 1 to 6 were determined using a fiber tensile strength tester. Then, a random nonwoven fabric sample were analyzed 10 times to (2) Moisture resistance: Thickness is measured after being left at 40±2° C. and 95% RH for 22 hours, and then at 23±2° C. and 50±5% RH for an hour (3) Compressive modulus (%)=H1/H0×100 (H0: Thickness of specimen before pressurization; H1: Thickness of specimen after pressure aging)

TABLE 1

| Items | | Example 1 | Example 2 | Example 3 | Example 4 | Example 5 | Example 6 |
|---|---|---|---|---|---|---|---|
| Fiber fineness uniformity (%) | | 83 | 72 | 75 | 82 | 83 | 81 |
| Sound | 1,000 Hz | 0.21 | 0.21 | 0.16 | 0.24 | 0.18 | 0.16 |
| absorption | 2,000 Hz | 0.55 | 0.56 | 0.50 | 0.58 | 0.51 | 0.47 |
| coefficient | 3,150 Hz | 0.85 | 0.81 | 0.84 | 0.87 | 0.79 | 0.76 |
| | 5,000 Hz | 0.85 | 0.80 | 0.85 | 0.88 | 0.78 | 0.76 |
| Compressive modulus (%) | | 35 | 34 | 34 | 26 | 33 | 25 | determine the standard deviation, and the fiber fineness uniformity of each of the multilayer meltblown nonwoven fabrics manufactured in Examples 1 to 6 was measured based on the standard deviation.

(2) Sound Absorption Properties

Sound absorption coefficients of each of the multilayer meltblown nonwoven fabrics manufactured in Examples 1 to 6 were measured at 1,000 Hz, 2,000 Hz, 3,150 Hz, and 5,000 Hz according to ISO 354 (Acoustics—Measurement of sound absorption in a reverberation room) using ALPHA CABIN equipment. (However, the sound absorption property test was performed using a flat test specimen with a size of 840 mm×840 mm without a peripheral frame, and five or more specimens were measured, and an arithmetic mean value was recorded.)

(3) Compressive Modulus

Each of the multilayer meltblown nonwoven fabrics manufactured in Examples 1 to 6 was cut into a size of 100 mm×100 mm to prepare test specimens. Then, each of the test specimens was placed between steel sheets with a size of 100 mm×100 mm×0.8 mm, and a 500 g weight was placed in the center of the top steel sheet. In this state, the test specimen was kept stationary under the following conditions, and the weight was removed to measure the compressive modulus after situation adjustment (conditions for state adjustment: kept stationary at 23±2° C. and 50±5% RH for an hour) (However, a thickness measurement method was performed by putting a test specimen with a size of 100 mm×100 mm on a specimen holder, placing a 150 g pressure plate with a size of 120 mm×120 mm on the test specimen to apply pressure to the test specimen, and measuring a thickness of the test specimen at a pressure of 0.1 kPa or less after 10 seconds using a 1 cm² disk-type pressure device. Also, points for thickness measurement were marked as the central points of respective sides of the pressure plate, and an arithmetic mean value of the four points was taken as the thickness. Equipment according to ISO 5084 was used as the measuring device.).

Conditions (1) Heat resistance: Thickness is measured after being left at 120±2° C. for an hour, and then at 23±2° C. and 50±5% RH for an hour As shown in Table 1, it can be seen that the multilayer meltblown nonwoven fabric manufactured in Example 1 had excellent fiber fineness uniformity and an excellent compressive modulus, and also had excellent sound absorption properties in a high-frequency region as well as in a low-frequency region.

INDUSTRIAL APPLICABILITY

The present invention relates to a multilayer meltblown nonwoven fabric and a method for manufacturing the same, and more particularly, to a multilayer meltblown nonwoven fabric having excellent lightweightness while exhibiting excellent durability, and a method of manufacturing the same.

While one embodiment of the present invention has been described above, the spirit of the present invention is not limited to the embodiments proposed in this specification. Other embodiments may be easily suggested by adding, changing and removing components by those skilled in the art and will fall within the spirit and scope of the present invention.

What is claimed is:

1. A multilayer meltblown nonwoven fabric comprising:
a first meltblown nonwoven fabric composed of hollow fibers having a hollowness of 30% or more, and the first meltblown nonwoven fabric having a basis weight of 200 gsm to 300 gsm and a thickness of 35 mm to 45 mm; and
a second meltblown nonwoven fabric stacked on one surface or both surfaces of the first meltblown nonwoven fabric, and the second meltblown nonwoven fabric having a basis weight of 60 gsm to 165 gsm and a thickness of 10 mm to 30 mm,
wherein the second meltblown nonwoven fabric is composed of ultrafine fibers having an average diameter of 1 to 10 μm.

2. The multilayer meltblown nonwoven fabric of claim 1, wherein the hollow fibers have an average diameter of 15 to 30 μm and a specific gravity of 1.0 or less.

3. The multilayer meltblown nonwoven fabric of claim 1, wherein the first meltblown nonwoven fabric and the second meltblown nonwoven fabric have a basis weight ratio of 1:0.22 to 0.42.

4. The multilayer meltblown nonwoven fabric of claim 1, wherein the first meltblown nonwoven fabric and the second meltblown nonwoven fabric have a thickness ratio of 1:0.35 to 0.65.

5. The multilayer meltblown nonwoven fabric of claim 1, wherein each of the hollow fibers and the ultrafine fibers comprise one or more selected from polyethylene terephthalate (PET) fibers, polytetramethylene terephthalate (PTT) fibers, polybutylene terephthalate (PBT) fibers, and polypropylene (PP) fibers.

6. The multilayer meltblown nonwoven fabric of claim 1, wherein the second meltblown nonwoven fabric has the basis weight of 60 gsm to 100 gsm.

7. The multilayer meltblown nonwoven fabric of claim 1, wherein the first meltblown nonwoven fabric has a basis weight of 250 gsm and the second meltblown nonwoven fabric has the basis weight of 80 gsm.

8. A multilayer spunbond nonwoven fabric comprising a spunbond nonwoven fabric as the outermost layer and having at least one meltblown nonwoven fabric layer formed as an inner layer, wherein the meltblown nonwoven fabric layer comprises the multilayer meltblown nonwoven fabric of claim 1.

9. The multilayer spunbond nonwoven fabric of claim 8, wherein the multilayer spunbond nonwoven fabric is used for automobile sound-absorbing materials.

* * * * *